(12) United States Patent
Okamoto (10) Patent No.: US 11,581,561 B2
(45) Date of Patent: Feb. 14, 2023

(54) CELL, CELL STACK DEVICE, MODULE, AND MODULE HOUSING DEVICE

(71) Applicant: KYOCERA Corporation, Kyoto (JP)

(72) Inventor: Takahiro Okamoto, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/613,883

(22) PCT Filed: May 26, 2020

(86) PCT No.: PCT/JP2020/020650
§ 371 (c)(1),
(2) Date: Nov. 23, 2021

(87) PCT Pub. No.: WO2020/246303
PCT Pub. Date: Dec. 10, 2020

(65) Prior Publication Data
US 2022/0238903 A1 Jul. 28, 2022

(30) Foreign Application Priority Data
Jun. 3, 2019 (JP) .............................. JP2019-103769

(51) Int. Cl.
*H01M 8/1253* (2016.01)
*H01M 8/126* (2016.01)
(Continued)

(52) U.S. Cl.
CPC ......... *H01M 8/1253* (2013.01); *H01M 8/126* (2013.01); *H01M 8/2475* (2013.01); *H01M 2008/1293* (2013.01)

(58) Field of Classification Search
CPC ............... H01M 8/1253; H01M 8/126; H01M 8/2475; H01M 2008/1293
See application file for complete search history.

(56) References Cited

U.S. PATENT DOCUMENTS 9,780,382 B2 10/2017 Hori
10,454,089 B2 10/2019 Oda et al.
(Continued)

FOREIGN PATENT DOCUMENTS

CN 102549824 A 7/2012
JP H11-86886 A 3/1999
(Continued)

OTHER PUBLICATIONS

Decision to Grant a Patent for the corresponding JP Application No. 2020-547249, dated Nov. 24, 2020, 5 pages.
(Continued)

*Primary Examiner* — Muhammad S Siddiquee
(74) *Attorney, Agent, or Firm* — Procopio Cory Hargreaves and Savitch LLP (57) ABSTRACT

A cell includes an element portion including a first electrode layer, a solid electrolyte layer that contains Zr and that is located above the first electrode layer, an intermediate layer that contains $CeO_2$ containing a rare earth element other than Ce and that is located above the solid electrolyte layer, and a second electrode layer located above the intermediate layer. The intermediate layer includes a first intermediate layer and a second intermediate layer that contains Zr and Ce and that is located at at least a portion between the first intermediate layer and the solid electrolyte layer. In a plan view from the second electrode layer, the second intermediate layer located at an outer peripheral portion of the intermediate layer includes a portion with a thickness greater than the second intermediate layer overlapping a center of the second electrode layer. A cell stack device, a module, and a module housing device include a plurality of the cells.

12 Claims, 9 Drawing Sheets

(51) Int. Cl.
H01M 8/2475 (2016.01)
H01M 8/12 (2016.01)

(56) References Cited

U.S. PATENT DOCUMENTS

| | | | |
|---|---|---|---|
| 2010/0285391 | A1 | 11/2010 | Higuchi et al. |
| 2012/0189939 | A1* | 7/2012 | Fujimoto ............ H01M 8/1253 429/465 |
| 2016/0164108 | A1 | 6/2016 | Matsuno et al. |
| 2017/0301957 | A1* | 10/2017 | Park .................... H01M 50/183 |

FOREIGN PATENT DOCUMENTS

| JP | 2004-119161 A | 4/2004 |
|---|---|---|
| JP | 2008-226653 A | 9/2008 |
| JP | 2008-226654 A | 9/2008 |
| JP | 2009-163884 A | 7/2009 |
| JP | 2010-238437 A | 10/2010 |
| JP | 2012-104407 A | 5/2012 |
| JP | 2012-146671 A | 8/2012 |
| JP | 2012-181928 A | 9/2012 |
| JP | 2012-248473 A | 12/2012 |
| JP | 2013-157190 A | 8/2013 |
| JP | 2015-035416 A | 2/2015 |
| JP | 2016-207258 A | 12/2016 |
| JP | 6097873 B1 | 3/2017 |
| JP | 2017-117663 A | 6/2017 |
| JP | 2017-183265 A | 10/2017 |

OTHER PUBLICATIONS

Written Opposition to the Grant of a Patent for the corresponding JP Patent No. 6818960, dated Jul. 21, 2021, 118 pages.
Decision on Opposition of the Patent Formal Objection No. 2021-700714 for corresponding JP Patent No. 6818960 (App. No. 2020-547249), dated Dec. 3, 2021, 106 pages.
International Search Report and Written Opinion for the corresponding PCT Application No. PCT/JP2020/020650 dated Aug. 25, 2020.

* cited by examiner

CELL, CELL STACK DEVICE, MODULE, AND MODULE HOUSING DEVICE

CROSS-REFERENCE TO RELATED APPLICATIONS

This application is national stage application of International Application No. PCT/JP2020/020650, filed on May 26, 2020, which designates the United States, incorporated herein by reference, and which claims the benefit of priority from Japanese Patent Application No. 2019-103769, filed on Jun. 3, 2019, the entire contents of which are incorporated herein by reference.

TECHNICAL FIELD

The present disclosure relates to a cell, a cell stack device, a module, and a module housing device.

BACKGROUND ART

In recent years, fuel cells have been proposed as next-generation energy sources. A fuel cell is a type of cell capable of obtaining power using a fuel gas such as a hydrogen-containing gas and an oxygen-containing gas such as air.

A fuel cell includes, for example, a conductive support body, a fuel electrode layer that is provided above the electrically conductive support body and that contains Ni and $ZrO_2$ solid solution containing a rare earth element, a solid electrolyte layer that is provided above the fuel electrode layer and that contains a $ZrO_2$ solid solution containing a rare earth element, and an air electrode layer that is provided above the solid electrolyte layer and that contains a perovskite composite oxide containing Sr.

For example, Patent Documents 1 and 2 propose a fuel cell in which an intermediate layer of a $CeO_2$ solid solution containing a rare earth element other than Ce is provided between a solid electrolyte layer and an air electrode layer.

CITATION LIST

Patent Document

Patent Document 1: JP 2008-226653 A
Patent Document 2: JP 2008-226654 A

SUMMARY

A cell of the present disclosure includes an element portion including a first electrode layer, a solid electrolyte layer that contains Zr and that is located above the first electrode layer, an intermediate layer that contains $CeO_2$ containing a rare earth element other than Ce and that is located above the solid electrolyte layer, and a second electrode layer located above the intermediate layer. The intermediate layer includes a first intermediate layer and a second intermediate layer containing Zr and Ce that is located at at least a portion between the first intermediate layer and the solid electrolyte layer. In a plan view from the second electrode layer, the second intermediate layer located at an outer peripheral portion of the intermediate layer includes a portion with a thickness greater than the second intermediate layer overlapping a center of the second electrode layer.

A cell stack device of the present disclosure includes a cell stack in which a plurality of the above-mentioned cells are stacked.

A module of the present disclosure includes the above-mentioned cell stack device, and a housing container for housing the cell stack device.

A module housing device of the present disclosure includes the above-described module, an auxiliary device for operating the module, and an external case housing the above-described module and the above-described auxiliary device.

DESCRIPTION OF EMBODIMENTS

Cell

Solid oxide fuel cells will be described using an example of cells that constitute a cell stack.

Figure 1:
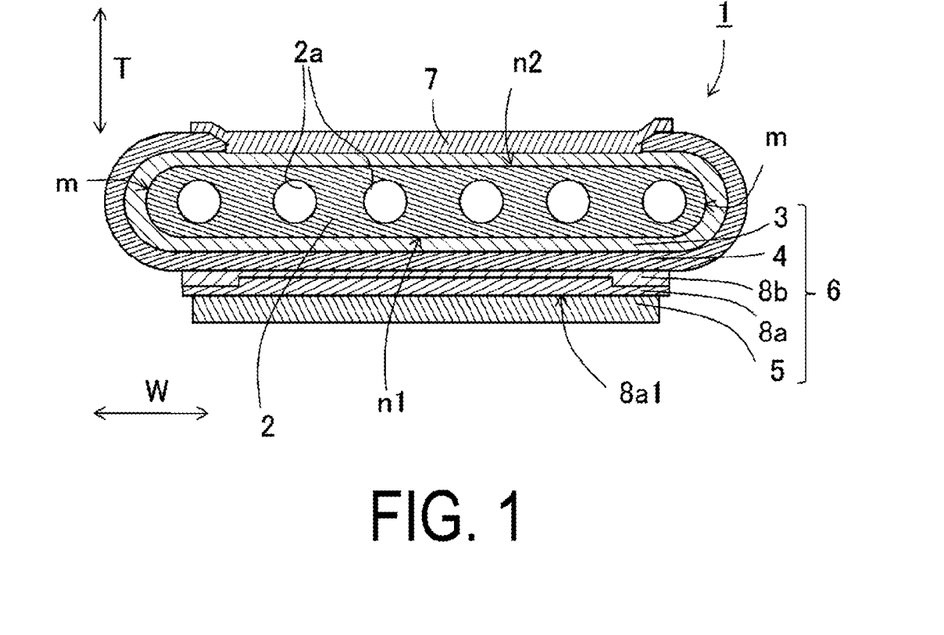
FIG. 1 is a horizontal cross-sectional view illustrating one example of a cell.
Figure 2:
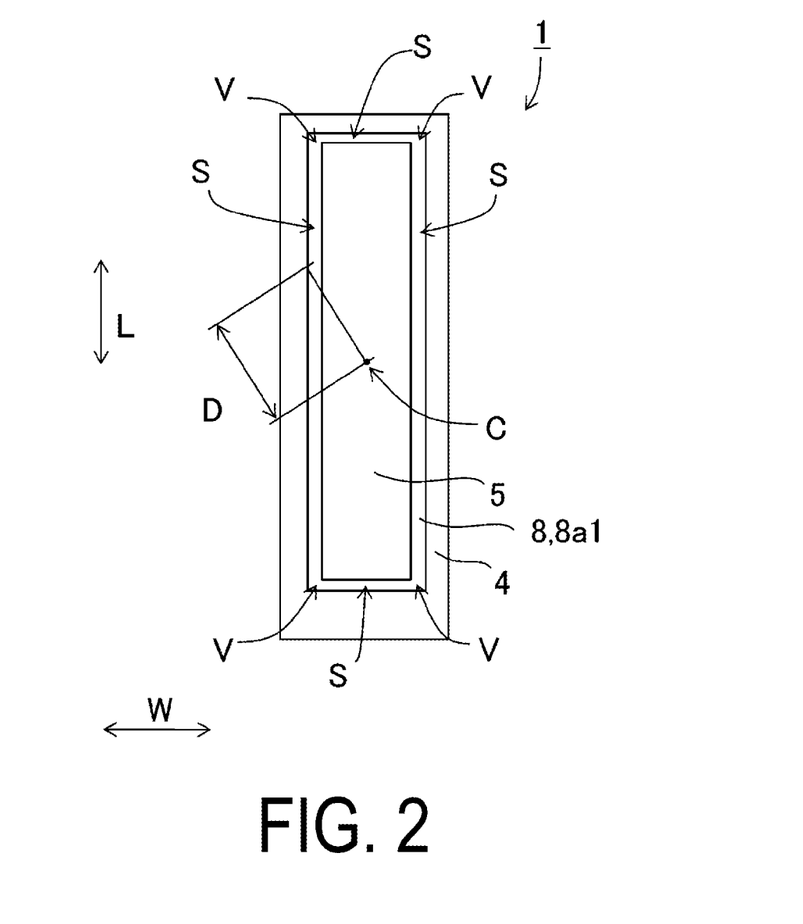
FIG. 2 is a plan view illustrating one example of the bottom surface in FIG. 1.
Figure 3:
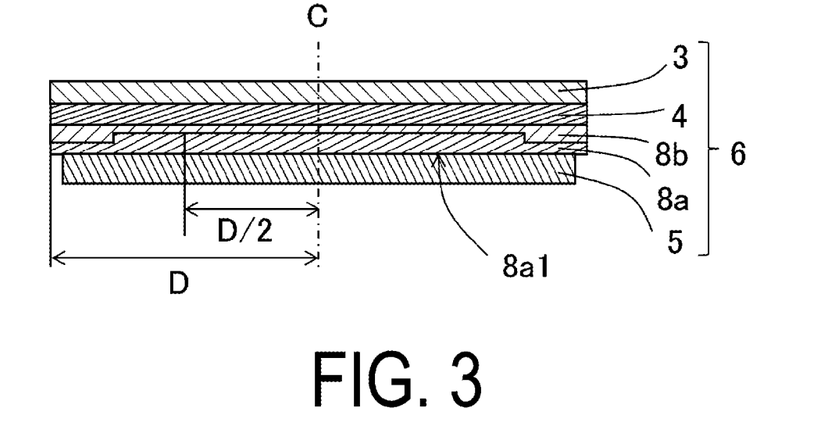
FIG. 3 is a diagram illustrating one example of a discretionary cross-section including a center C of an element portion and a surrounding region.

FIG. 1 is a horizontal cross-sectional view illustrating one example of a cell. FIG. 2 is a plan view illustrating one example of the bottom surface in FIG. 1. Note that, in the drawings of the present disclosure, the description of one or more components may be omitted, and one or more components may be illustrated in an enlarged manner.

A cell 1 illustrated in FIGS. 1 and 2 has a hollow, flat plate shape and is elongated. As illustrated in FIG. 2, when the cell 1 is viewed from a lower surface or upper surface in its entirety, the cell 1 is rectangular-shaped, from 5 cm to 50 cm in a length direction L, and from 1 cm to 10 cm in a width direction W orthogonal to this length direction L. The total thickness of the cell 1 is from 1 mm to 5 mm. T denotes the thickness direction of cell 1.

As illustrated in FIG. 1, the cell 1 includes a support body 2 and an element portion 6 including a first electrode layer 3, a solid electrolyte layer 4, and a second electrode layer 5. The support body 2 may have a hollow, flat plate shape having a pillar shape including a pair of opposing flat surfaces, a first flat surface n1 and a second flat surface n2, and a pair of circular arc shaped side surfaces m connecting the first flat surface n1 and the second flat surface n2 to each other.

The element portion 6 is located on the first flat surface n1 of the support body 2. Note that, in the following description, the first electrode layer 3 is a fuel electrode layer and the second electrode layer 5 is an air electrode layer. An interconnector 7 is located on the second flat surface n2 of the support body 2. Also, the cell 1 illustrated in FIG. 1 includes an intermediate layer 8 located between the solid electrolyte layer 4 and the second electrode layer 5.

The support body 2 includes a gas-flow passage 2a through which gas flows in the length direction. The support body 2 illustrated in FIG. 1 includes six gas-flow passages 2a.

The support body 2 has gas permeability that allows a fuel gas flowing through the gas-flow passage 2a to pass through to the first electrode layer 3.

The support body 2 may have electrical conductivity. The support body 2 with electrical conductivity serves as a first current collector body that collects electricity generated by the element portion 6 from the first electrode layer 3, facilitating current collection of the generated electricity at the interconnector 7 from the element portion 6.

The support body 2, for example, may contain an iron group metal component and an inorganic oxide. For example, the iron group metal component may be Ni and/or NiO. The inorganic oxide may be a specific rare earth oxide. The specific rare earth oxide is able to close the gap between the thermal expansion coefficient of the support body 2 and the thermal expansion coefficient of the solid electrolyte layer 4. The specific rare earth oxide may be a rare earth oxide containing, for example, at least one element from among Y, Lu, Yb, Tm, Er, Ho, Dy, Gd, Sm, and Pr. Specific examples of such a rare earth oxide include $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$. The volume ratio of the Ni and/or NiO to rare earth oxide in the support body 2 may be, for example, Ni and/or NiO:rare earth oxide=35:65 to 65:35. By setting the volume ratio of Ni and/or NiO to rare earth oxide within this range, good conductivity of the support body 2 can be maintained, and the thermal expansion coefficient can be brought close to that of the solid electrolyte layer 4.

The support body 2 may have, for example, an open porosity of 30% or greater and, in particular, from 35% to 50%. The support body 2 having such an open porosity has gas permeability. The electrical conductivity of the support body 2 may be, for example, 300 S/cm or greater and, in particular, 440 S/cm or greater.

A material commonly known as a fuel electrode may be used as the material for the first electrode layer 3. A porous electrically conductive ceramic, for example, a ceramic containing a $ZrO_2$ solid solution containing a rare earth element oxide and Ni and/or NiO may be used. The rare earth element oxide may be, for example, $Y_2O_3$ or the like. Hereinafter, a $ZrO_2$ solid solution containing a rare earth element oxide may be referred to as stabilized zirconia. The stabilized zirconia also includes in its meaning partially stabilized zirconia.

The solid electrolyte layer 4 is an electrolyte that transfers ions between the first electrode layer 3 and the second electrode layer 5. The solid electrolyte layer 4 has gas shielding properties and makes it difficult for the fuel gas and the oxygen-containing gas to leak. The solid electrolyte layer 4 may be, for example, a $ZrO_2$ solid solution containing, for example, from 3 mol % to 15 mol % of a rare earth element oxide. This rare earth oxide may be, for example, $Y_2O_3$. Note that the material of the solid electrolyte layer 4 may be formed from another material, provided that this other material exhibits the above-described properties.

The material of the second electrode layer 5 is not particularly limited, provided that the material is typically used as an air electrode. The air electrode may be, for example, a so-called $ABO_3$ perovskite oxide electrically conductive ceramic. The perovskite oxide may be, for example, a complex oxide in which Sr and La coexist at an A-site. Examples of the composite oxide in which Sr and La coexist at an A-site include $La_xSr_{1-x}Co_yFe_{1-y}O_3$, $La_xSr_{1-x}MnO_3$, $La_xSr_{1-x}FeO_3$, $La_xSr_{1-x}CoO_3$, and the like. Note that x satisfies $0<x<1$, and y satisfies $0<y<1$. The air electrode has gas permeability. The open porosity of the air electrode may be 20% or greater and, in particular, range from 30% to 50%.

The cell 1 may include a second current collector body on the second electrode layer 5. The material of the second current collector body may be, for example, a $LaFeO_3$-based or $LaMnO_3$-based perovskite oxide, or may be the material of the second electrode layer 5 described above. The second current collector may be located on the intermediate layer 8 or the solid electrolyte layer 4. Note that, in a plan view, a portion located in a region that does not overlap with the intermediate layer 8 and that has the same composition as the second electrode layer 5 is a part of the second current collector body rather than the second electrode layer 5.

A material such as a lanthanum chromite-based perovskite-type oxide ($LaCrO_3$-based oxide) or a lanthanum strontium titanium-based perovskite-type oxide ((La,Sr)$TiO_3$-based oxide) may be used for the interconnector 7. These materials have electrically conductive properties and do not decompose upon coming into contact with the fuel gas such as a hydrogen-containing gas or an oxygen-containing gas such as air.

The interconnector 7 is a dense material, making it difficult for the fuel gas flowing in the gas-flow passage 2a inside the support body 2 and the oxygen-containing gas flowing on the outside of the support body 2 to leak. The interconnector 7 may have a relative density of 93% or greater and, in particular, 95% or greater.

Note that the cell 1 may include a cohesion layer with a composition similar to that of the first electrode layer 3 located between the interconnector 7 and the support body 2. The cohesion layer reduces stress caused by a difference in the thermal expansion coefficients of the interconnector 7 and the support body 2.

The intermediate layer 8 may be a $CeO_2$-based sintered body containing a rare earth element other than Ce, for example. The $CeO_2$-based sintered body may, for example, include a composition represented by $(CeO_2)_{1-x}(REO_{1.5})_x$. In the formula $(CeO_2)_{1-x}(REO_{1.5})_x$, RE is at least one of Sm, Y, Yb, and Gd, and x is a number that satisfies $0<x<0.3$.

The intermediate layer 8 is located between the solid electrolyte layer 4 and the second electrode layer 5, and has a role of making it difficult for the components of the solid electrolyte layer 4 and the components of the second electrode layer 5 to react with each other. When the components of the solid electrolyte layer 4, for example, Zr, and the components of the second electrode layer 5, for example, Sr in the air electrode, react with each other, a reaction layer having high electrical resistance is produced. With the intermediate layer 8 being located between the solid electrolyte layer 4 and the second electrode layer 5, it is difficult for the components of the solid electrolyte layer 4 and the components of the second electrode layer 5 to react with each other. Furthermore, Sm or Gd may be used as the RE in the intermediate layer 8 to reduce electrical resistance. For example, a $CeO_2$ solid solution containing from 10 mol % to 20 mol % of $SmO_{1.5}$ or $GdO_{1.5}$ may be used as the $(CeO_2)_{1-x}(REO_{1.5})_x$.

The intermediate layer 8 of the cell 1 includes a first intermediate layer 8a and a second intermediate layer 8b. The first intermediate layer 8a is in contact with the second electrode layer 5. A first surface 8a1 is a surface on the side where the intermediate layer 8 comes into contact with the second electrode layer 5. The area of the first surface 8a1 is the same as the area of the second electrode layer 5 or greater than the area of the second electrode layer 5. The contour of the second electrode layer 5 is the same as the contour of the first surface 8a1 or is located inward from the contour of the first surface 8a1. The area of the solid electrolyte layer 4 may be greater than the area of the first surface 8a1. Note that the contour of the first surface 8a1 may be referred to as the contour of the intermediate layer 8, and the area of the first surface 8a1 may be referred to as the area of the intermediate layer 8.

The second intermediate layer 8b is located in at least a portion between the solid electrolyte layer 4 and the first intermediate layer 8a. The $CeO_2$ contained in the intermediate layer 8 and the $ZrO_2$ contained in the solid electrolyte layer 4 may react with each other and produce components having a high electrical resistance. The second intermediate layer 8b is a layer containing the Zr and Ce obtained by the reaction between the $CeO_2$ and the $ZrO_2$.

Here, the region with a ratio of Zr of 15 at. % or less based on 100% of the total amount of Zr, Ce, and a rare earth element other than Ce is the first intermediate layer 8a, and the region with a ratio of Ce of from 5 at. % to 85 at. % is the second intermediate layer 8b. The first intermediate layer 8a may contain 85 at. % or greater of Ce based on the total amount of Zr, Ce, and a rare earth element other than Ce. The solid electrolyte layer 4 may contain 5 at. % or less of Ce based on the total amount of Zr, Ce, and a rare earth element other than Ce.

The intermediate layer 8 is formed by adding a solvent or the like to a $CeO_2$ raw material powder containing a rare earth element other than Ce to prepare a slurry, applying the slurry on the solid electrolyte layer 4, and performing heat treatment to sinter the raw material powder. In the sintered intermediate layer 8, the $CeO_2$ and the $ZrO_2$ react across the entire surface interface with the solid electrolyte layer 4, and the second intermediate layer 8b tends to have a generally uniform thickness across the entire surface interface between the intermediate layer 8 and the solid electrolyte layer 4.

Here, as illustrated in FIG. 2, in a plan view, the area center of gravity of the second electrode layer 5 is defined as a center C, and the distance from the center C to the contour of the first surface 8a1 is D. At this time, the outer peripheral portion of the intermediate layer 8 is a portion with a distance from the center C of D/2 or greater, and the center portion of the second electrode layer 5 is a portion with a distance from the center C of D/2 or less. FIGS. 3 to 6 are diagrams illustrating a discretionary cross section including the element portion 6 and the surrounding center C.

In an example of a first example of the cell 1 of the present disclosure, in a plan view from the second electrode layer 5, the second intermediate layer 8b located on the outer peripheral portion of the intermediate layer 8 includes a portion thicker than the second intermediate layer 8b overlapping the center C of the second electrode layer 5 as illustrated in FIGS. 3 to 6. Hereinafter, the thickness of each layer is the thickness in the layering direction in which the first electrode layer 3, the solid electrolyte layer 4, and the intermediate layer 8 are layered.

Note that the "second intermediate layer 8b located on the outer peripheral portion of the intermediate layer 8" may be simply referred to as the "second intermediate layer 8b of the outer peripheral portion", and the "second intermediate layer 8b overlapping the center C of the second electrode layer 5" may simply be referred to as the "second intermediate layer 8b of the center C".

The second intermediate layer 8b containing Zr and Ce has high electrical resistance. When the second intermediate layer 8b having high electrical resistance is located in the element portion 6, the power generation efficiency of the cell 1 may be reduced. The element portion 6 is a region where the first electrode layer 3, the solid electrolyte layer 4, and the second electrode layer 5 overlap and is a region responsible for power generation of the cell 1. In general, the area of the second electrode layer 5 in a plan view is less than the area of the first electrode layer 3 and the solid electrolyte layer 4, so the area of the element portion 6 that is responsible for power generation is roughly the same as the area of the second electrode layer 5. Thus, by reducing the thickness of the second intermediate layer 8b located in the element portion 6 and, in particular, the thickness of the second intermediate layer 8b overlapping the center C of the second electrode layer 5, the effect of the second intermediate layer 8b on the power generation efficiency of the cell 1 can be reduced.

The second intermediate layer 8b is formed by the components of the first intermediate layer 8a and the components of the solid electrolyte layer 4 reacting with each other. Thus, the first intermediate layer 8a and the solid electrolyte layer 4 can be strongly bonded to each other. Accordingly, in a case where the second intermediate layer 8b is thick, that is, the reaction layer is thick, the first intermediate layer 8a strongly bonds with the solid electrolyte layer 4.

The first intermediate layer 8a easily separates from the solid electrolyte layer 4, particularly at the outer peripheral portion of the intermediate layer 8. The second intermediate layer 8b at the outer peripheral portion of the intermediate layer 8 includes a thicker portion than the second intermediate layer 8b at the center C of the second electrode layer 5. Thus, the first intermediate layer 8a can be made difficult to peel off from the solid electrolyte layer 4 at the outer peripheral portion.

In a plan view of the second electrode layer 5, the area of the intermediate layer 8 may be greater than the area of the second electrode layer 5. At this time, the cell 1 may include the second intermediate layer 8b which is thicker at the portion of the outer peripheral portion of the intermediate layer 8 that does not overlap with the second electrode layer 5 than the second intermediate layer 8b at the center C of the second electrode layer 5. Even in a case where the second intermediate layer 8b having a high electrical resistance is located at a portion of the outer peripheral portion that does not overlap with the second electrode layer 5, the power generation efficiency of the cell 1 is not affected.

Figure 4:
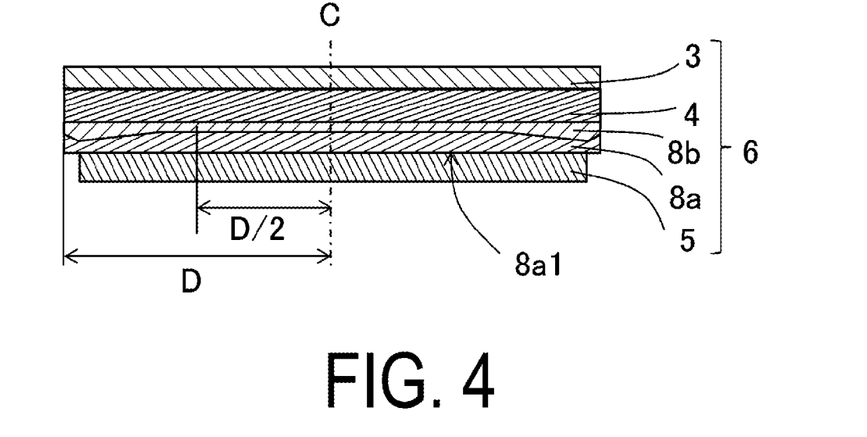
FIG. 4 is a diagram illustrating one example of a discretionary cross-section including the center C of the element portion and the surrounding region.

In addition, in particular, peeling of the first intermediate layer 8a from the solid electrolyte layer 4 tends to originate at or near the contour of the intermediate layer 8 in particular. The cell 1 includes the second intermediate layer 8b having a portion that is thicker than the second intermediate layer 8b at the center C near the contour of the intermediate layer 8. Thus, it is possible to make the first intermediate layer 8a more difficult to peel off from the solid electrolyte layer 4. As illustrated in FIG. 4, the second intermediate layer 8b may include a portion having a maximum thickness between the contour of the second electrode layer 5 and the contour of the intermediate layer 8. Note that the cell 1 may include, at the outer peripheral portion of the intermediate layer 8, the second intermediate layer 8b having a portion that is thinner than the second intermediate layer 8b at the center C.

In addition, the cell 1 need not include the second intermediate layer 8b that overlaps with the center C of the second electrode layer 5.

The thickness of the second intermediate layer 8b located at the outer peripheral portion of the intermediate layer 8 and the thickness of the second intermediate layer 8b that overlaps the center C of the second electrode layer 5 can be confirmed by performing elemental analysis of the cross section along the layering direction of the outer peripheral portion and the cross section along the layering direction of the center C, for example. Specifically, the thickness of the second intermediate layer 8b can be confirmed by performing area analysis of the cross section or line analysis in the layering direction for the Zr element and the Ce element. Elemental analysis may be performed using, for example, Scanning Transmission Electron Microscope-Energy Dispersive X-ray Spectroscopy (STEM-EDS).

Furthermore, the ratio of the Zr and Ce contained in the intermediate layer 8 may be calculated from the results of quantitative analysis using STEM-EDS, and the thickness of the second intermediate layer 8b may be confirmed. Specifically, a sample for evaluation of a cross section including the second electrode layer 5, the intermediate layer 8, and the solid electrolyte layer 4 of the cell 1 is made using a Focused Ion Beam (FIB)-micro sampling method. The ratio of the Zr and Ce can be confirmed by quantitative analysis of the cross section of the prepared evaluation sample along the layering direction using STEM-EDS.

Specifically, quantitative analysis of the elements contained in the outer peripheral portion of the intermediate layer 8 and the center C of the second electrode layer 5 is performed along the layering direction. Here, the region with a ratio of Ce of from 5 at. % to 85 at. % based on 100% of the total amount of Zr, Ce, and a rare earth element other than Ce is the second intermediate layer 8b, and thicknesses thereof are measured and compared.

In an example of a second example of the cell 1 of the present disclosure, in a plan view from the second electrode layer 5, the average thickness of the second intermediate layer 8b located on the outer peripheral portion of the intermediate layer 8 is greater than the average thickness of the second intermediate layer 8b overlapping the center portion of the second electrode layer 5. The "second intermediate layer 8b overlapping the center portion of the second electrode layer 5" may simply be referred to as the "second intermediate layer 8b at the center portion".

In the second example, by reducing the average thickness of the second intermediate layer 8b at the center portion of the second electrode layer 5, that is, the center portion of the element portion 6, the electrical resistance of the intermediate layer 8 in the element portion 6 is reduced, and the effect of the second intermediate layer 8b on the power generation efficiency of the cell 1 can be reduced.

Also, in the second example, the first intermediate layer 8a can be made more difficult to peel off from the solid electrolyte layer 4 at the outer peripheral portion.

Furthermore, the average thickness of the second intermediate layer 8b at the outer peripheral portion is thick and the average thickness of the second intermediate layer 8b at the center portion is thin. Thus, the electrical resistance of the intermediate layer 8 at the center portion is relatively less than the electrical resistance of the intermediate layer 8 at the outer peripheral portion. As a result, the electricity generated in the cell 1 tends to flow easily to the center portion, and the current path of the cell 1 is easily controlled.

The cell 1 may include, at at least a portion of the outer peripheral portion of the intermediate layer 8, the second intermediate layer 8b with a thickness that is greater than the maximum thickness of second intermediate layer 8b at the center portion.

In a plan view of the second electrode layer 5, the area of the intermediate layer 8 may be greater than the area of the second electrode layer 5. At this time, the cell 1 may include, at the portion of the outer peripheral portion of the intermediate layer 8 that does not overlap with the second electrode layer 5, the second intermediate layer 8b with a thickness that is greater than the average thickness of the second intermediate layer 8b at the center portion. Of the outer peripheral portion, the average thickness of the second intermediate layer 8b at the portion that does not overlap the second electrode layer 5 may be greater than the average thickness of the second intermediate layer 8b of the entire portion overlapping the second electrode layer 5, that is the entirety of the element portion 6. In the element portion 6, when the average thickness of the second intermediate layer 8b is less than the average thickness of the second intermediate layer 8b at the portion that does not overlap with the second electrode layer 5, the electrical resistance of the intermediate layer 8 can be made lower in the element portion 6, and the effect of the second intermediate layer 8b on the power generation efficiency of the cell 1 can be reduced.

Note that, of the portion that does not overlap with the second electrode layer 5 of the outer peripheral portion, the thickness of the second intermediate layer 8b at or near the contour of the second electrode layer 5 may be greater than the thickness of the second intermediate layer 8b at or near the contour of the intermediate layer 8. The cell 1 may include, at a portion of the outer peripheral portion of the intermediate layer 8, the second intermediate layer 8b with a thickness that is less than the average thickness of the second intermediate layer 8b at the center portion. The cell 1 may include, at at least a portion at or near the contour of the intermediate layer 8, the second intermediate layer 8b with a thickness that is less than the average thickness of the second intermediate layer 8b at the center portion.

In addition, the cell 1 need not include the second intermediate layer 8b that overlaps with the center portion of the second electrode layer 5.

The ratio of the Zr and Ce contained in the intermediate layer 8 can be confirmed by quantitative analysis using, for example, STEM-EDS.

Specifically, a sample for evaluation of a cross section including the second electrode layer 5, the intermediate layer 8, and the solid electrolyte layer 4 of the cell 1 can be made using a FIB-micro sampling method, and the ratio can be confirmed by quantitative analysis using STEM-EDS on the sample.

Specifically, quantitative analysis of the elements contained in the outer peripheral portion of the intermediate layer 8 and the center portion of the second electrode layer 5 is performed along the layering direction at ten discretionary points. Here, the region with a ratio of Ce of from 5 at. % to 85 at. % based on 100% of the total amount of Zr, Ce, and a rare earth element other than Ce is the second intermediate layer 8b, and this thickness is measured, and the average thickness of the second intermediate layer 8b at the outer peripheral portion and the average thickness of the second intermediate layer 8b at the center portion are measured and compared. Note that, in a case where there is no region with a ratio of Ce of from 5 at. % to 85 at. % based on 100% of the total amount of Zr, Ce, and rare earth elements other than Ce, the thickness of the second intermediate layer 8b is set to 0.

The intermediate layer 8 of the first example and the second example may be formed, for example, by applying different concentrations of $CeO_2$ to relevant portions on the solid electrolyte layer 4. Furthermore, depending on the desired thickness of the second intermediate layer 8b, the intermediate layer 8 may be formed by changing the amount of $CeO_2$ diffusion into the solid electrolyte layer 4.

In a case where the thickness of the second intermediate layer 8b is adjusted by varying the amount of $CeO_2$ diffusion into the solid electrolyte layer 4, the intermediate layer 8 may be formed by the following method, for example. First, a slurry is prepared by adding a solvent or the like to a $CeO_2$ raw material powder containing a rare earth element other than Ce, the slurry is printed or transferred to the outer peripheral portion of the region on the solid electrolyte layer 4 where the second electrode layer 5 is to be disposed, and this is then fired at a maximum temperature of 1400° C. or higher to form a sintered layer. A sheet-shaped intermediate layer molded body may be made and then layered at the outer peripheral portion at a region on the solid electrolyte layer 4 where the second electrode layer 5 is to be disposed, and this may then be fired to form a sintered layer.

Next, for example, a physical or chemical vapor deposition method, such as Pulse Laser Deposition (PLD), Ion Assist Deposition (IAD), or the like is used to form a film of $CeO_2$ including a rare earth element other than Ce, such as Gd, Sm, or the like, at the center portion of a region on the solid electrolyte layer 4 where the second electrode layer 5 is to be disposed.

In this manner, the second intermediate layer 8b containing Ce and Zr is formed at the outer peripheral portion of the solid electrolyte layer 4 fired at a high temperature together with $CeO_2$ containing a rare earth element other than Ce. On the other hand, in the region on the solid electrolyte layer 4 where the second electrode layer 5 is to be disposed, a $CeO_2$ film containing a rare earth element other than Ce is formed via a physical or chemical vapor deposition method. The film formed by the physical or chemical vapor deposition method is relatively dense, and there is no need for heat treatment at a high temperature such as, for example, 1400° C. or higher, so as to sinter the powder. Thus, in the case of a film formed by a physical or chemical vapor deposition method, the $CeO_2$ and the $ZrO_2$ do not easily react with each other. Accordingly, the second intermediate layer 8b containing Ce and Zr is unlikely to be formed in the region on the solid electrolyte layer 4 where the second electrode layer 5 is to be disposed. As a result, a portion with a thickness that is greater than the thickness of the second intermediate layer 8b overlapping the center C of the second electrode layer 5 or the average thickness of the second intermediate layer 8b overlapping the center portion is formed in the second intermediate layer 8b located at the outer peripheral portion of the intermediate layer 8. A portion of the sinterd layer that has not reacted with the solid electrolyte layer 4 and the $CeO_2$ film containing a rare earth element other than Ce that is vaper deposited are the first intermediate layer 8a. Note that a film of $CeO_2$ containing a rare earth element other than Ce may be further formed on the heat-treated sintered layer.

In the first example and the second example, the thickness of the sintered layer of the intermediate layer 8 may be, for example, from 3 μm to 5 μm. The film thickness of the formed intermediate layer 8 may be, for example, from 0.1 μm to 3.0 μm.

The shape of the first surface 8a1 of the intermediate layer 8 may be circular, elliptical, or polygonal with three or more corner portions V and three or more side portions S. Here, the corner portions V include the vertices of the contour of the first surface 8a1 and the region inward from the contour. The side portions S include the sides of the contour of the first surface 8a1 and the region inward from the contour. FIG. 2 is a diagram illustrating the cell 1 including the first surface 8a1 with a quadrilateral shape. In a case where the first surface 8a1 has a polygonal shape, such as a triangular shape, a quadrilateral shape, or the like, for example, the cell 1 may include the second intermediate layer 8b at least at portions overlapping the corner portions V of the first surface 8a1. The thickness of the second intermediate layer 8b that overlaps the corner portions V may be greater than the thickness of the second intermediate layer 8b at the center C or the average thickness of the second intermediate layer 8b at the center portion.

In the first surface 8a1 with a polygonal shape, the first intermediate layer 8a tends to easily separate from the solid electrolyte layer 4, particularly at the corner portions V. By disposing the second intermediate layer 8b at the corner portions V where the first intermediate layer 8a easily separates, the bonding strength between the first intermediate layer 8a and the solid electrolyte layer 4 at the corner portions V can be increased, making it difficult for the first intermediate layer 8a to peel off from the solid electrolyte layer 4 at the corner portions V.

In a case where the first surface 8a1 has a polygonal shape, the cell 1 may include the second intermediate layer 8b that overlaps with at least the side portions S that connect adjacent pairs of the corner portions V of the first surface 8a1. The first intermediate layer 8a tends to easily separate from the solid electrolyte layer 4 at the side portions S, as with the corner portions V. By disposing the second intermediate layer 8b at the side portions S, the bonding strength between the first intermediate layer 8a and the solid electrolyte layer 4 at the side portions S can be increased, making it difficult for the first intermediate layer 8a to peel off from the solid electrolyte layer 4 at the side portions S. The thickness of the second intermediate layer 8b that overlaps the side portions S may be greater than the thickness of the second intermediate layer 8b at the center C or the average thickness of the second intermediate layer 8b at the center portion.

The cell 1 may include the second intermediate layer 8b that overlaps at least two of the side portions S of the three or more side portions S. The thickness of the second intermediate layer 8b that overlaps the two side portions S may be greater than the thickness of the second intermediate layer 8b at the center C or the average thickness of the second intermediate layer 8b at the center portion. In a case where the first surface 8a1 includes four or more side portions S, the second intermediate layer 8b may overlap at each of two opposing side portions S. When the second intermediate layer 8b overlaps each of two opposing side portions S, the bonding strength with the solid electrolyte layer 4 at both opposing end portions of the intermediate layer 8 is increased, making it more difficult for the first intermediate layer 8a to peel off from the solid electrolyte layer 4.

Figure 5:
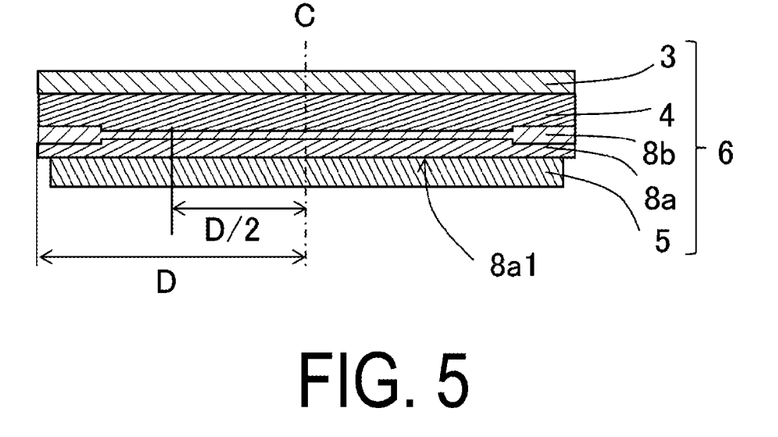
FIG. 5 is a diagram illustrating one example of a discretionary cross-section including the center C of the element portion and the surrounding region.
Figure 6:
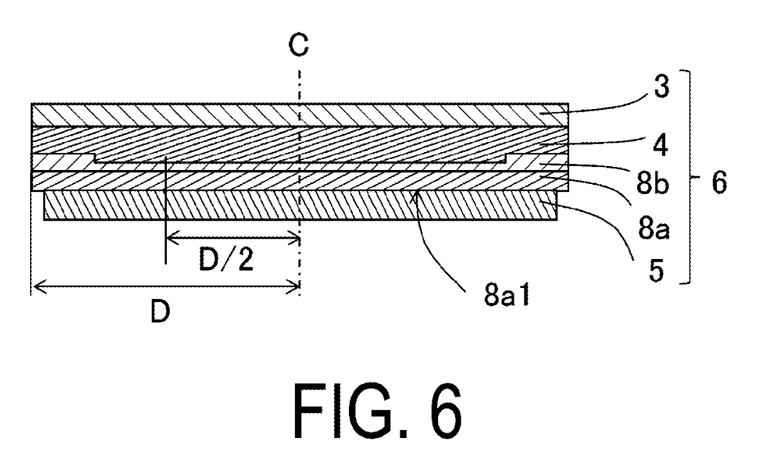
FIG. 6 is a diagram illustrating one example of a discretionary cross-section including the center C of the element portion and the surrounding region.

As illustrated in FIGS. 5 and 6, the average thickness of the solid electrolyte layer 4 overlapping the center portion of the second electrode layer 5 may be greater than the average thickness of the solid electrolyte layer 4 overlapping the outer peripheral portion of the intermediate layer 8. In FIGS. 5 and 6, the center portion of the second electrode layer 5 is also the center portion of the element portion 6. Stress is generated, in particular, at the center portion of the element portion 6 due to temperature changes associated with the operation and shutdown of the fuel cell, and cracks easily occur and propagate in the dense solid electrolyte layer 4. By increasing the average thickness of the solid electrolyte layer 4 in the center portion, it is possible to increase the durability of the element portion 6 and also the entirety of the cell 1.

Figure 7:
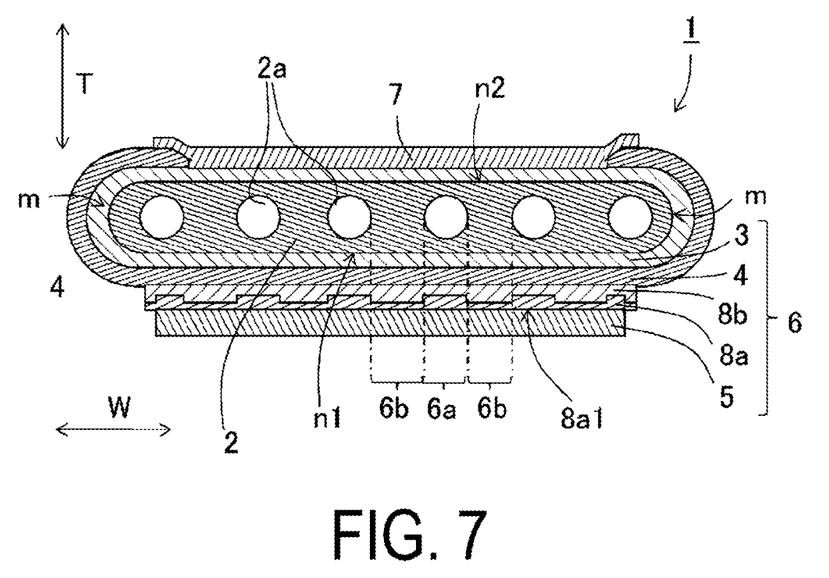
FIG. 7 is a horizontal cross-sectional view illustrating one example of a cell of a third example.

An example of a third example of the cell 1 of the present disclosure will now be described. As illustrated in FIG. 7, in a plan view of the element portion 6 from the second electrode layer 5, a portion of the element portion 6 overlapping the gas-flow passage 2a is referred to as a first portion 6a, and a portion that does not overlap with the gas-flow passage 2a is referred to as a second portion 6b. In this example of a third example, the average thickness of the second intermediate layer 8b at the first portion 6a is less than the average thickness of the second intermediate layer 8b at the second portion 6b. The fuel gas flows through the gas-flow passage 2a, and the fuel gas passes through the support body 2 from the gas-flow passage 2a and reaches the element portion 6. Thus, the first portion 6a that overlaps with the gas-flow passage 2a has a greater power generation amount than the second portion 6b. By making the thickness of the second intermediate layer 8b at the first portion 6a thinner than the thickness of the second intermediate layer 8b at the second portion 6b, the electrical resistance of the intermediate layer 8 at the first portion 6a having a large power generation amount is reduced, and the power generation efficiency of the cell 1 can be increased.

The cell 1 of the third example may be manufactured by the following method, for example. First, a support body powder compact is produced. A green body is prepared by mixing an iron group metal of Ni or the like or an oxide powder thereof, a powder of a rare earth element oxide such as $Y_2O_3$, an organic binder, and a solvent. A support body powder compact is then made by extrusion molding using this green body, and the compact is dried. Here, a calcined body in which the support body powder compact is calcined for 2 to 6 hours at a maximum temperature of from 900° C. to 1,000° C. may be used as the support body powder compact.

Next, a slurry for the fuel electrode layer is produced. Raw materials of a NiO powder and a $ZrO_2$ powder solid solution containing $Y_2O_3$ are weighed and mixed in accordance with a predetermined mixing composition. Hereinafter, the $ZrO_2$ solid solution containing $Y_2O_3$ may be referred to as YSZ. Then, a slurry for the fuel electrode layer is prepared by mixing an organic binder and a solvent in the mixed powder.

Next, a solid electrolyte layer powder compact is produced. A slurry is formed by adding toluene, a binder, a commercially-available dispersing agent, and the like to a $ZrO_2$ powder solid solution containing a rare earth element. The obtained slurry is molded to a thickness of from of 7 μm to 75 μm using a doctor blade method or the like to produce a sheet-shaped solid electrolyte layer compact.

A slurry for a fuel electrode is applied on the sheet-shaped solid electrolyte layer compact to form a fuel electrode compact, and a layered body, that is a first layered powder compact, of the solid electrolyte layer compact, and the fuel electrode compact is produced. A support body compact is layered on the surface of the first layered powder compact on the fuel electrode compact side to form a second layered powder compact. Note that after the slurry for the fuel electrode is applied and dried on a predetermined location of the support body compact, the solid electrolyte layer compact on which the slurry for the fuel electrode is applied may be layered on the support body compact.

Next, an interconnector sheet is produced. A slurry for an interconnector is prepared by mixing interconnector material such as a $LaCrO_3$-based oxide powder with an organic binder and a solvent. The slurry for an interconnector is formed into a sheet shape to produce an interconnector sheet.

The produced interconnector sheet is layered on the surface of the support body compact on which the solid electrolyte layer compact of the second layered powder compact is not formed, and a third layered powder compact is produced.

The intermediate layer 8 may be formed on the surface of the solid electrolyte layer compact of the third layered powder compact via the following method, for example.

For example, raw material powder for the intermediate layer powder compact is prepared by wet-pulverizing a $CeO_2$ powder solid solution containing $GdO_{1.5}$, $SmO_{1.5}$, or the like. Toluene is added as a solvent to the obtained raw material powder to produce the slurry for an intermediate layer. The slurry for an intermediate layer is applied on the solid electrolyte layer compact at the second portion 6b that does not overlap with the gas-flow passage 2a to form an intermediate layer precursor. Note that a sheet-shaped compact for an intermediate layer may be produced and layered on the solid electrolyte layer compact at the second portion 6b. The slurry for an intermediate layer may also be transferred to the solid electrolyte layer compact at the second portion 6b.

After the third layered powder compact with a formed intermediate layer is debinded, firing is performed for 2 hours to 6 hours at a maximum temperature of from 1400° C. to 1600° C. in an oxygen containing atmosphere to obtain a sintered body with a formed sintered layer of the intermediate layer 8. Via this firing process, the $CeO_2$ contained in the intermediate layer precursor and the $ZrO_2$ contained in the solid electrolyte layer compact react with each other to form the second intermediate layer 8b.

A $CeO_2$ film containing Gd, Sm, or the like is formed on the surface of the obtained fired solid electrolyte layer 4 using a physical or chemical vapor deposition method such as that described above. A $CeO_2$ film containing Gd, Sm, or the like may be formed multiple times on the surface of the solid electrolyte layer 4. A $CeO_2$ film containing Gd, Sm, or the like may be formed on the sintered layer of the intermediate layer 8.

The $CeO_2$ film containing Gd, Sm, or the like may be formed, for example, via the following method. For example, in vacuum vapor deposition of $CeO_2$ containing Gd, Sm, or the like, gas ions of approximately several 100 eV, such as $Ar^+$ ions, $O^{2-}$ ions, or the like may be fired via an ion gun, this kinetic energy being used to destroy and compress the $CeO_2$ containing Gd, Sm, or the like growing dendritically, to form a film.

The formed $CeO_2$ film containing Gd, Sm, or the like may be baked by heat treatment at a temperature ranging from a temperature lower than 1400° C., for example, 1000° C. or higher to a maximum temperature lower than 1400° C. for 2 hours to 10 hours. In a temperature range lower than 1400° C., the $CeO_2$ in the film is less likely to react with the $ZrO_2$. Note that after further applying the slurry for an intermediate layer described above, for example, on the formed $CeO_2$ film containing Gd, Sm, or the like, heat treatment may be performed at a temperature lower than 1400° C.

A portion of the intermediate layer precursor that has unreacted with the solid electrolyte layer 4 and the $CeO_2$ film containing Gd, Sm, or the like that is vapor deposited correspond to the first intermediate layer 8a.

An air electrode is formed on the first intermediate layer 8a of the sintered compact. First, a slurry for an air electrode containing a material for an air electrode, for example, a $LaFeO_3$-based oxide powder, a solvent and a pore-forming agent is produced. The slurry for an air electrode is applied onto the first intermediate layer 8a by a method such as dipping, screen printing, or the like to form an air electrode compact. The sintered body formed with the air electrode compact is fired at a maximum temperature of, for example, from 1000° C. to 1300° C. At this time, a P-type semiconductor layer may be formed as necessary at a predetermined position of the interconnector 7. The P-type semiconductor layer may be formed by applying a slurry containing a $LaFeO_3$-based oxide powder and a solvent to a predetermined position of the interconnector 7 by a method such as dipping, screen printing, or the like, and then baking for 2 to 6 hours at a maximum temperature of from 1000° C. to 1300° C., for example.

In this manner, the hollow flat plate-shaped cell 1 having the configuration illustrated in FIG. 7 can be manufactured. Note that a reduction treatment for the support body 2 and the fuel electrode may be performed with hydrogen gas being fed inside the obtained cell 1, that is, the gas-flow passage 2a. The conditions of the reduction treatment may be, for example, 0.5 hours to 20 hours at a maximum temperature of from 650° C. to 1000° C.

The third example of the cell 1 manufactured in this manner includes the first intermediate layer 8a containing $CeO_2$ containing a rare earth element other than Ce and the second intermediate layer 8b containing Zr and Ce, and, as illustrated in FIG. 7, the average thickness of the second intermediate layer 8b at the first portion 6a is greater than the average thickness of the second intermediate layer 8b at the second portion 6b. Accordingly, the bonding strength between the solid electrolyte layer 4 and the second electrode layer 5 can be increased, and the power generation efficiency can be increased.

In the third example of the cell 1, in a plan view from the second electrode layer 5, as in the first example, the second intermediate layer 8b at the outer peripheral portion of the intermediate layer 8 may include a thicker portion than the second intermediate layer 8b at the center C of the second electrode layer 5, or, as in the second example, the average thickness of the second intermediate layer 8b at the outer peripheral portion may be greater than the average thickness of the second intermediate layer 8b at the center portion. Furthermore, the third example may have the various advantages described with respect to the first example and the second example.

Cell Stack Device and Module

Figure 8:
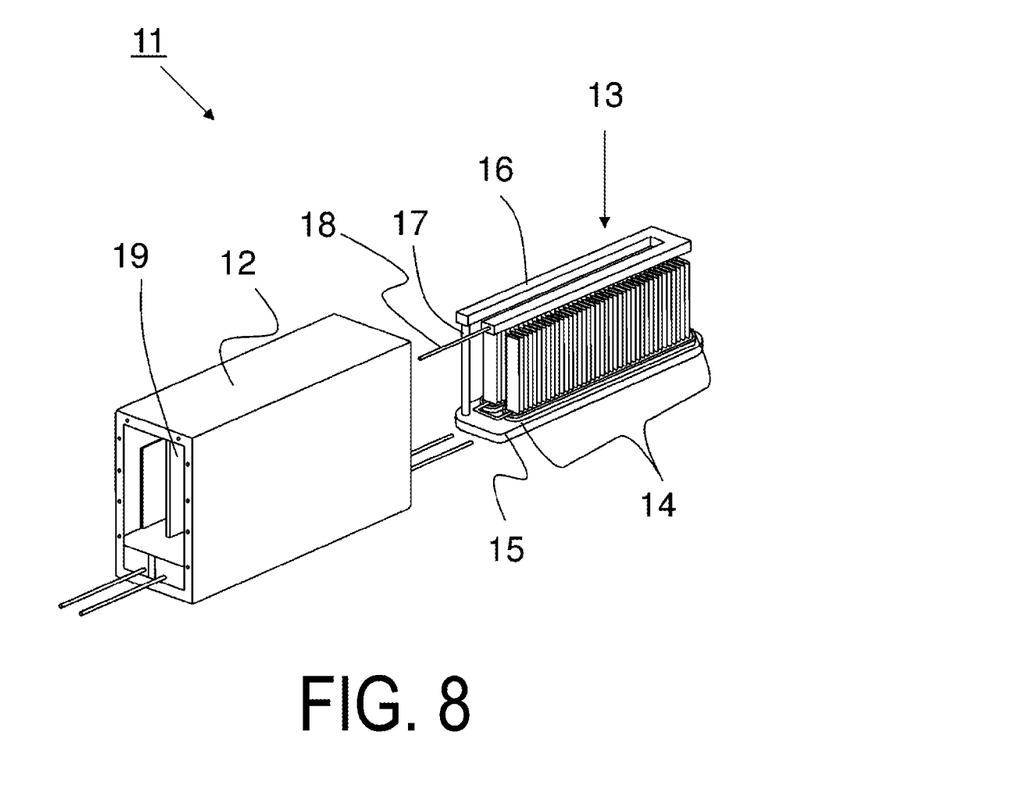
FIG. 8 is an exterior perspective view illustrating one example of a module.

FIG. 8 is an exterior perspective view illustrating one example of a module. A module 11 includes a housing container 12 illustrated on the left side of FIG. 8 and a cell stack device 13 illustrated on the right side of FIG. 8. The cell stack device 13 is housed in the housing container 12.

The cell stack device 13 illustrated on the right side of FIG. 8 is one example of a cell stack device. The cell stack device 13 includes a cell stack 14 in which a plurality of the cells 1 are arrayed and a gas tank 15. A reformer 16 is disposed above the cell stack 14. The reformer 16 is connected to the gas tank 15 by a gas flow pipe 17. The reformer 16 reforms raw fuel such as natural gas or kerosene supplied via a raw fuel supply pipe 18 to produce fuel gas. The gas flow pipe 17 supplies the fuel gas reformed by the reformer 16 to the gas tank 15. The fuel gas is supplied from the gas tank 15 to the gas-flow passage 2a of the cell 1.

The cell stack 14 includes the plurality of cells 1 and current collection members (not illustrated) that electrically connect adjacent cells 1 to each other in series. The cells 1 located at the outermost ends in the array direction of the cell stack 14 are electrically connected to end current collectors (not illustrated) and electricity generated by the cells 1 can be collected and drawn out.

The cell stack device 13 of the present disclosure is provided with a plurality of cells 1 having high durability and high power generation efficiency, and thus the cell stack device 13 with high durability and high power generation efficiency can be obtained.

The housing container 12 includes an oxygen-containing-gas inlet member 19 therein. The oxygen-containing-gas inlet member 19 in FIG. 8 is disposed between two cell stacks 14 in a state in which the cell stack device 13 is housed in the housing container 12. The oxygen-containing-gas inlet member 19 supplies the oxygen-containing gas to the lower end portion of the cell 1.

The oxygen-containing gas flows along the side of the cell 1 from the lower end portion to the upper end portion in accordance with the flow of the fuel gas by the oxygen-containing-gas inlet member 19. The fuel gas discharged from the gas-flow passage 2a of the cell 1 to the upper end portion of the cell 1 is mixed with the oxygen-containing gas and burned. By burning the fuel gas discharged at the upper end portion of the cell 1, the temperature of the cell 1 rises, and the activation of the cell stack device 13 can be accelerated. In addition, by burning the fuel gas at the upper end portion of the cell 1, the reformer 16 disposed above the cell 1 is heated, and the reformer 16 can efficiently perform a reformation reaction.

The module 11 of the present disclosure is provided with a plurality of cells 1 having high durability and high power generation efficiency, and thus the module 11 with high durability and high power generation efficiency can be obtained.

FIG. 8 illustrates a state in which the front surface portion and the rear surface portion of the housing container 12 are removed, and the cell stack device 13 housed inside the housing container 12 is taken out backward. The module 11 illustrated in FIG. 8 can house the cell stack device 13 by sliding the cell stack device 13 in the housing container 12. The cell stack device 13 need not include the reformer 16.

Module Housing Device

Figure 9:
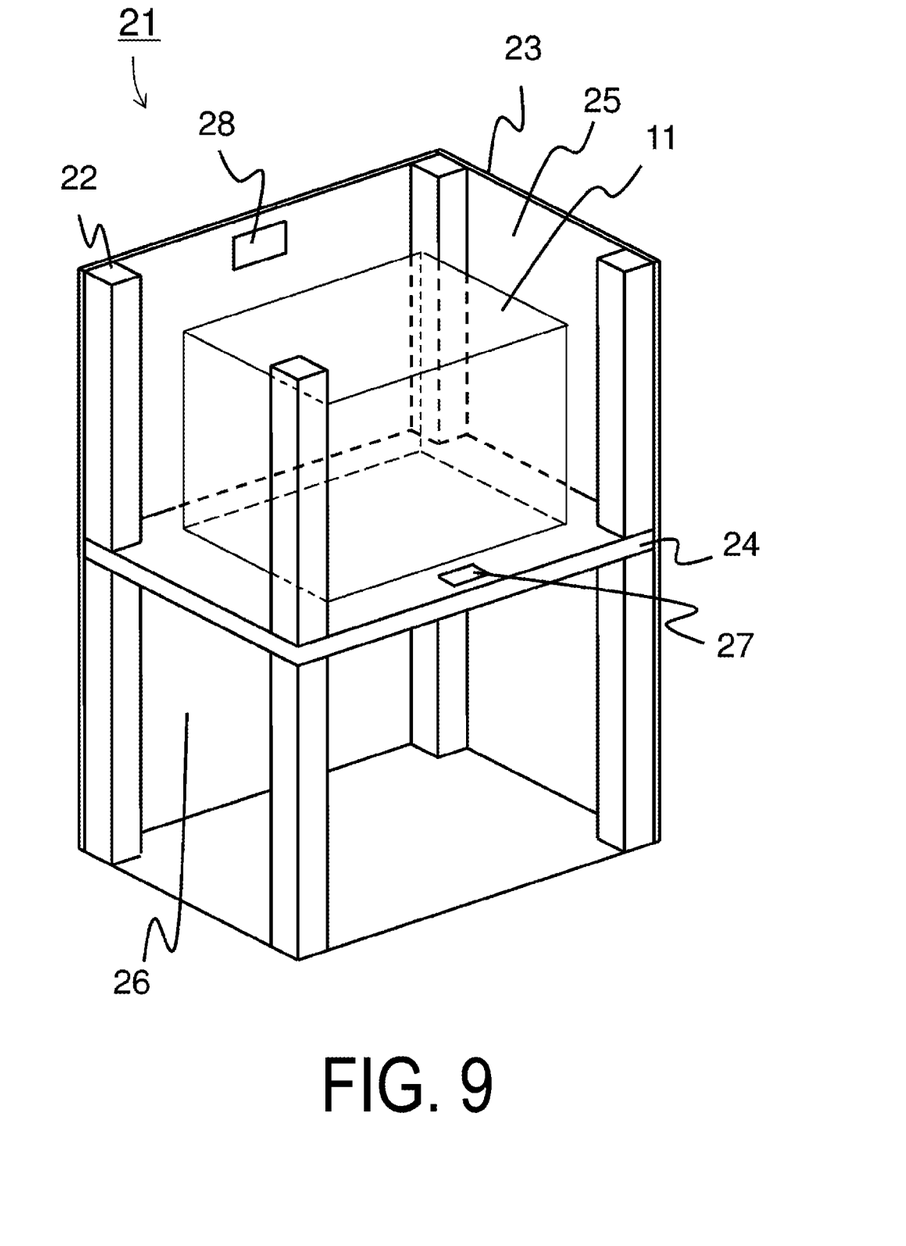
FIG. 9 is a perspective view illustrating one example of a module housing device.

FIG. 9 is an exploded perspective view illustrating an example of a module housing device. Note that some configurations are omitted in FIG. 9. A module housing device 21 includes the module 11, an auxiliary device for operating the module 11, and an external case that houses the module 11 and the auxiliary device.

The module housing device 21 illustrated in FIG. 9 includes a support 22 and an outer plate 23. A dividing plate 24 divides the inside of the external case into upper and lower spaces. A space above the dividing plate 24 in the external case is a module housing chamber 25 that houses the module 11, and a space below the dividing plate 24 in the external case is an auxiliary device housing chamber 26 that houses the auxiliary device for operating the module 11. Note that the description of the auxiliary device to be housed in the auxiliary device housing chamber 26 is omitted.

The dividing plate 24 includes an air flow port 27 for allowing the air in the auxiliary device housing chamber 26 to flow into the module housing chamber 25. One of the outer plates 23 forming the module housing chamber 25 includes an exhaust opening 28 for discharging the air in the module housing chamber 25. The air in the module housing chamber 25 is discharged from the exhaust opening 28.

Since the module housing device 21 is provided with the module 11 described above in the module housing chamber 25, the module housing device 21 can be made highly durable.

The present disclosure has been described in detail above. However, the present disclosure is not limited to the embodiments described above. The cell, the cell stack device, the module, and the module housing device of the present disclosure may be variously modified, improved, and the like without departing from the gist of the present disclosure.

For example, in the examples described above, a hollow and flat plate fuel cell including a support body 2 was used as an example of the cell 1 of the present disclosure. However, a cylindrical cell or flat plate cell may be used. In the case of a cylindrical cell, the plan view of the present disclosure may be read as a plan view in which the circumferential surface of the cylinder is unrolled. For example, while a so-called vertical stripe cell is described in the above-described embodiment, it is possible to adopt a so-called horizontal stripe cell in which a plurality of power generating elements are provided on a supporting substrate. Further, in the above description, the fuel cell, the fuel cell stack device, the fuel cell module, and the fuel cell device are respectively illustrated as one example of the "cell", the "cell stack device", the "module", and the "module housing device". However, in another example, the "cell", the "cell stack device", the "module", and the "module housing device" may be an electrolysis cell, an electrolysis cell stack device, an electrolysis module, and an electrolysis device, respectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A cell, comprising:
   an element portion comprising
     a first electrode layer,
     a solid electrolyte layer that contains Zr and that is located above the first electrode layer,
     an intermediate layer that contains $CeO_2$ containing a rare earth element other than Ce and that is located above the solid electrolyte layer, and
     a second electrode layer located above the intermediate layer, wherein
   the intermediate layer comprises
     a first intermediate layer and
     a second intermediate layer containing Zr and Ce that is located at at least a portion between the first intermediate layer and the solid electrolyte layer, and
   in a plan view from the second electrode layer, the second intermediate layer located at an outer peripheral portion of the intermediate layer comprises a portion with a thickness greater than the second intermediate layer overlapping a center of the second electrode layer, the greater thickness outer peripheral portion of the second intermediate layer being sandwiched between the first intermediate layer and the solid electrolyte layer.

2. A cell, comprising:
   an element portion comprising
   a first electrode layer,
   a solid electrolyte layer that contains Zr and that is located above the first electrode layer,
   an intermediate layer that contains $CeO_2$ containing a rare earth element other than Ce and that is located above the solid electrolyte layer, and
   a second electrode layer located above the intermediate layer; wherein
   the intermediate layer comprises
   a first intermediate layer and
   a second intermediate layer containing Zr and Ce and located at at least a portion between the first intermediate layer and the solid electrolyte layer, and
   in a plan view from the second electrode layer, an average thickness of the second intermediate layer located at an outer peripheral portion of the intermediate layer is greater than an average thickness of the second intermediate layer overlapping a center portion of the second electrode layer, the greater thickness outer peripheral portion of the second intermediate layer being sandwiched between the first intermediate layer and the solid electrolyte layer.

3. The cell according to claim 1, wherein
   in a plan view from the second electrode layer, a contour of the intermediate layer comprises three or more corner portions and three or more side portions, and
   the second intermediate layer is provided at at least one of the three or more corner portions.

4. The cell according to claim 1, wherein
   in a plan view from the second electrode layer, a contour of the intermediate layer comprises three or more corner portions and three or more side portions, and
   the second intermediate layer is provided at, from among the three or more side portions, at least two side portions.

5. The cell according to claim 1, wherein
   in a plan view from the second electrode layer, an average thickness of the solid electrolyte layer overlapping a center portion of the second electrode layer is greater than an average thickness of the solid electrolyte layer overlapping the outer peripheral portion.

6. The cell according to claim 1, further comprising:
   a support body comprising at least one gas-flow passage, wherein
   the element portion further comprises
     a first portion that is disposed above the support body and that overlaps the gas-flow passage in a plan view from the second electrode layer and
     a second portion that does not overlap the gas-flow passage, and
   an average thickness of the second intermediate layer at the first portion is less than an average thickness of the second intermediate layer at the second portion.

7. A cell comprising:
   a support body comprising at least one gas-flow passage; and
   an element portion including
     a first electrode layer located above the support body,
     a solid electrolyte layer that contains Zr and that is located above the first electrode layer,
     an intermediate layer that contains $CeO_2$ containing a rare earth element other than Ce and that is located above the solid electrolyte layer, and
     a second electrode layer located above the intermediate layer, wherein the element portion further comprises a first portion that overlaps the gas-flow passage and
a second portion that does not overlap the gas-flow passage in a plan view from the second electrode layer, the intermediate layer comprises
a first intermediate layer and
a second intermediate layer containing Zr and Ce that is located at at least a portion between the first intermediate layer and the solid electrolyte layer, and an average thickness of the second intermediate layer at the first portion is less than an average thickness of the second intermediate layer at the second portion.

8. A cell stack device, comprising:
a cell stack in which a plurality of the cells according to claim 1 are stacked.

9. A module, comprising:
the cell stack device according to claim 8; and
a housing container for housing the cell stack device.

10. A module housing device, comprising:
the module according to claim 9;
an auxiliary device for operating the module; and
an external case housing the module and the auxiliary device.

11. A cell, comprising:
an element portion comprising
a first electrode layer,
a solid electrolyte layer that contains Zr and that is located above the first electrode layer,
an intermediate layer that contains $CeO_2$ containing a rare earth element other than Ce and that is located above the solid electrolyte layer, and
a second electrode layer located above the intermediate layer, wherein the intermediate layer comprises
a first intermediate layer and
a second intermediate layer containing Zr and Ce that is located at at least a portion between the first intermediate layer and the solid electrolyte layer, and in a plan view from the second electrode layer, the second intermediate layer located at an outer peripheral portion of the intermediate layer comprises a portion with a thickness greater than the second intermediate layer overlapping a center of the second electrode layer;

a support body comprising at least one gas-flow passage, wherein the element portion further comprises
a first portion that is disposed above the support body and that overlaps the gas-flow passage in a plan view from the second electrode layer and
a second portion that does not overlap the gas-flow passage, and an average thickness of the second intermediate layer at the first portion is less than an average thickness of the second intermediate layer at the second portion.

12. A cell, comprising:
an element portion comprising
a first electrode layer,
a solid electrolyte layer that contains Zr and that is located above the first electrode layer,
an intermediate layer that contains $CeO_2$ containing a rare earth element other than Ce and that is located above the solid electrolyte layer, and
a second electrode layer located above the intermediate layer; wherein the intermediate layer comprises
a first intermediate layer and
a second intermediate layer containing Zr and Ce and located at at least a portion between the first intermediate layer and the solid electrolyte layer, and in a plan view from the second electrode layer, an average thickness of the second intermediate layer located at an outer peripheral portion of the intermediate layer is greater than an average thickness of the second intermediate layer overlapping a center portion of the second electrode layer;

a support body comprising at least one gas-flow passage, wherein the element portion further comprises
a first portion that is disposed above the support body and that overlaps the gas-flow passage in a plan view from the second electrode layer and
a second portion that does not overlap the gas-flow passage, and an average thickness of the second intermediate layer at the first portion is less than an average thickness of the second intermediate layer at the second portion.

* * * * *